United States Patent [19]
Lewis

[11] Patent Number: 5,825,496
[45] Date of Patent: Oct. 20, 1998

[54] BOREHOLE OPTICAL LATERAL DISPLACEMENT SENSOR

[75] Inventor: Robert Edwin Lewis, Hobbs, N. Mex.

[73] Assignee: The United States of America as represented by the United States Department of Energy, Washington, D.C.

[21] Appl. No.: 705,470

[22] Filed: Aug. 29, 1996

[51] Int. Cl.$^6$ ................................................. G01B 11/14
[52] U.S. Cl. ................................. 356/375; 356/376
[58] Field of Search ................ 367/25, 33; 356/375, 356/376, 400, 401

[56] References Cited

U.S. PATENT DOCUMENTS

| | | | |
|---|---|---|---|
| 4,731,744 | 3/1988 | Harrell, Jr. et al. | 364/560 |
| 4,869,591 | 9/1989 | MacGregor | 356/153 |
| 5,430,953 | 7/1995 | De Souza | 33/787 |

*Primary Examiner*—Frank G. Font
*Assistant Examiner*—Zandra V. Smith
*Attorney, Agent, or Firm*—Armand McMillan; William R. Moser; Paul A. Gottlieb

[57] ABSTRACT

There is provided by this invention an optical displacement sensor that utilizes a reflective target connected to a surface to be monitored to reflect light from a light source such that the reflected light is received by a photoelectric transducer. The electric signal from the photoelectric transducer is then imputed into electronic circuitry to generate an electronic image of the target. The target's image is monitored to determine the quantity and direction of any lateral displacement in the target's image which represents lateral displacement in the surface being monitored.

3 Claims, 1 Drawing Sheet

BOREHOLE OPTICAL LATERAL DISPLACEMENT SENSOR

BACKGROUND OF THE INVENTION

1. Field of the Invention

The U.S. government has a paid-up license in this invention and the right in limited circumstances to require the patent owner to license others on reasonable terms as provided for by the terms of contract No. DE-AC04-86AL31950 awarded by the United States Department of Energy.

This invention relates generally to an optical sensing means in a borehole for measuring the relative horizontal offsetting between slipping rock masses or other ground plane slippage at excavation sites, and more particularly, to an optical sensing means for measuring the lateral displacement of a borehole.

2. Brief Description of the Prior Art

In the assessment of excavation performance, information on roof beam lateral displacement, expansion, and fracture formation is generally gathered using a variety of manually and remotely read instruments. Visual observations are also used when possible. Offset magnitudes are determined by the degree of occlusion in drill holes that intersect the offset plane. Offset measurements have historically been obtained by visual estimation of borehole occlusion.

Most instruments available for monitoring underground mining operations monitor displacement of excavation surfaces and do not have the capability to measure the relative displacement between slipping rock masses. In U.S. Pat. No. 5,418,758, entitled "Distance Measurement System", the measurement of roof convergence in underground mining was obtained using an ultrasonic distance measuring device that determined displacement by measuring the time difference between two reflectors of a sound wave passing between them. However, this device cannot measure the relative lateral displacement between slipping rock masses but only displacement along the length of the instrument.

Also see U.S. Pat. No. 5,430,953 where an apparatus is disclosed for detecting or measuring movements in geological formation and other massive structures. It utilizes movement sensors connected to linear potentiometers to determine displacement. Again, the device only measures displacement relative to the excavation surfaces and along the length of the instrument and cannot measure the relative displacement between slipping rock masses. Also, such mechanical devices are subject to fatigue in the elements and other mechanical misalignments that may lead to errors and other unreliable sensing. It would be desirable if there were provided a device that could make instantaneous measurement of lateral displacement and also describe the displacement vector, quantifying both magnitude and direction.

SUMMARY OF THE INVENTION

There is provided by this invention an optical lateral displacement sensor disposed to be mounted within a borehole for measuring lateral displacement in mining application which is generally comprised of an optical target and charged coupled device anchored above and below the sheer plane, respectively. A light source illuminates the target which is continuously monitored by the charged coupled device. The output of the charged coupled device, hereinafter referred to as CCD, is continuously monitored by an electronic monitoring means which detects any changes in the images received from the target, such images being an indication of displacement of the target within the borehole.

BRIEF DESCRIPTIONS OF THE DRAWINGS

BRIEF DESCRIPTION OF THE PREFERRED EMBODIMENT

Figure 1:
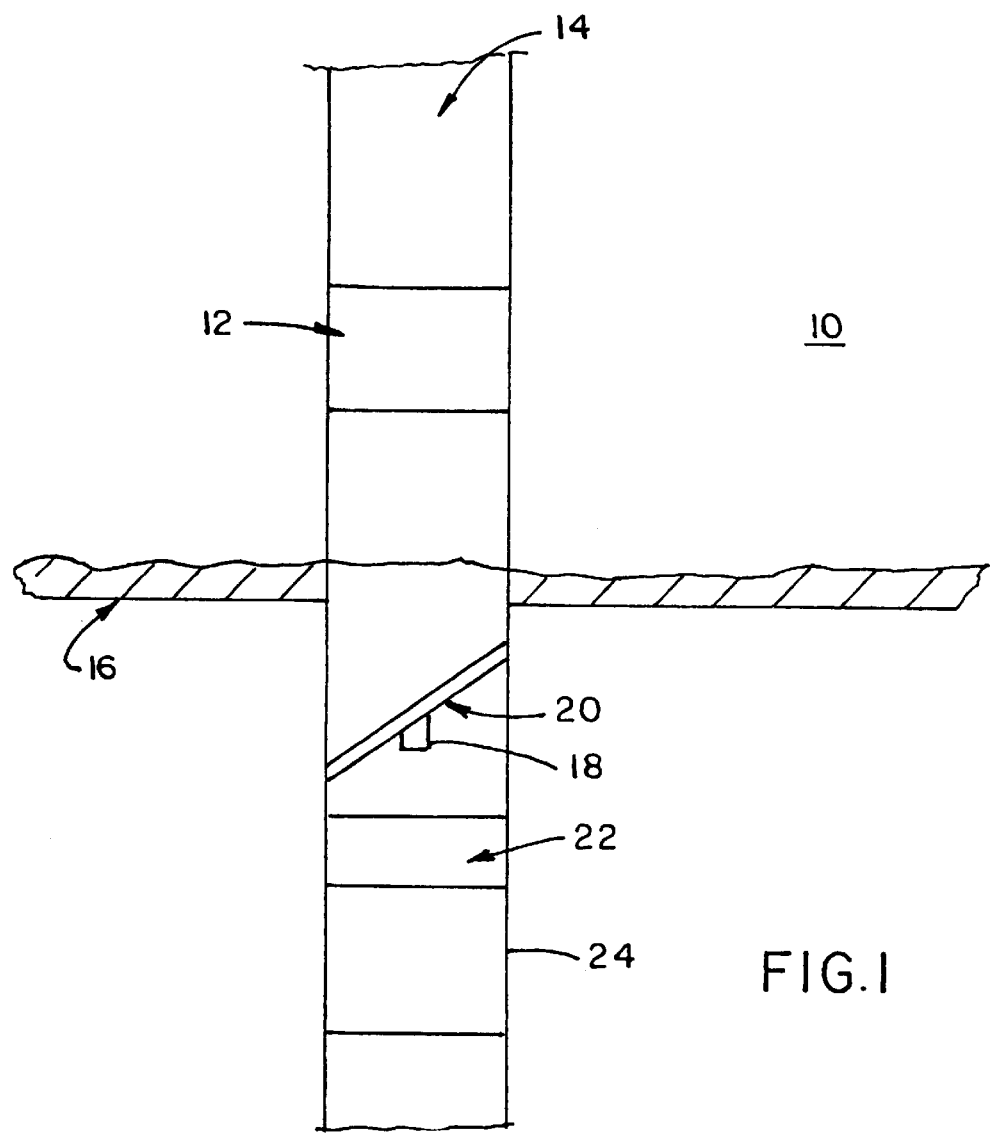
FIG. 1 is a perspective view of the borehole optical of displacement sensor incorporating the principles of this invention.

Referring to FIG. 1, there is shown a borehole optical displacement sensor 10 incorporating the principles of this invention. The borehole sensor 10 is generally comprised of an optical target 12 mounted in a three-inch borehole 14 above the sheer plane or geological surface to be monitored 16. The optical target 12 is a black surface constructed of a material designed to reduce light scattering and mirroring. This material may be a black polymer based material. An LED light source 18 illuminates the target through a quarter-wave wave plate 20. The illuminated target reflects light that is received by a charged coupled device 22. The pixels illuminated by the charged coupled device 22 are monitored by microprocessor and other electronic circuitry 24 that detects the position of the optical target. This electronic circuitry 24, not shown but well known to those skilled in the art, uses the electrical output of the charged coupled device 22 to generate an electronic image of the target. When the optical target is perfectly aligned within the borehole and there is no displacement, the output of the charged coupled device acts as a bench-mark for future displacements that may occur. By monitoring the pixels in the charged coupled device array that are activated by the reflected light beams from the target, a displacement vector can be determined by the electronics that would accurately monitor both the magnitude and the direction of any displacement in the geological plane. The device is powered by a 12-volt voltage source. Control of the device may be monitored through a serial communication link with a portable computer.

Figure 2A:
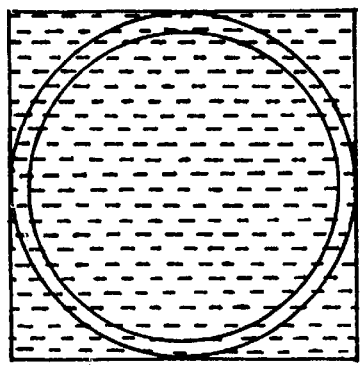
FIG. 2A illustrates the electronic image of the borehole target in perfect alignment.
Figure 2B:
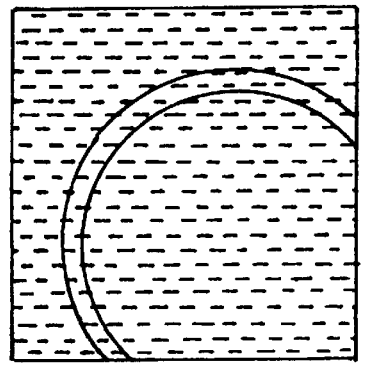
FIG. 2B illustrates an electronic image of the borehole target slightly aligned.
Figure 2C:
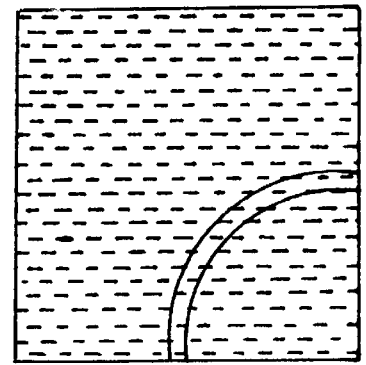
FIG. 2C illustrates an electronic image of the borehole target more severely out of alignment.

Referring to FIGS. 2A, 2B and 2C, there is shown an output the imaging electronics that displays an image of the target. FIG. 2A illustrates the imaging received by the pixels or the charged coupled device that represents the initial threshold values for comparison against future displacement.

FIG. 2B illustrates an image of the target taken at a later point in time when there has been displacement of the geological plane being monitored. The pixels being illuminated in a charged coupled device are different from the initial threshold values originally measured in FIG. 2A. Based upon the output of a charged coupled device, the electronics can measure the quantity and vector of displacement of the geological plane.

FIG. 2C illustrates an even greater displacement of the geological plane taken later in time than that image in FIG. 2B. Again, the threshold values of the charged coupled device are compared with the output of the device that is received from the target to determine the amount of displacement and the vector of displacement in a geological plane.

It can readily be seen that there is provided by this invention a unique and novel optical system for measuring lateral displacement in underground mining applications that can continuously monitor the quantity and direction of any displacement vector of the geological plane.

Although there has been illustrated and described specific detail and structure of operation, it is clearly understood that the same were merely for purposes of illustration and that changes and modifications may be readily made therein by those skilled in the art without departing from the spirit and scope of this invention.

I claim:

1. An optical displacement sensor, comprising:
   a) a light source means disposed to be mounted in a borehole below the surface of a geological plane for directing light at a target disposed to be mounted in the borehole above the surface of the geological plane;
   b) a black surface on the target for reflecting light from the light source means wherein the black surface reduces light scattering and mirroring;
   c) photoelectric transducing means for receiving the reflected light from the target and converting the reflected light into an electric signal;
   d) digital imaging means connected to the photoelectric transducing means for generating an image of the target; and
   e) an electronic circuit means connected to the digital imaging means for measuring the quantity and direction of any displacement of the target's image wherein the displacement of the target image in the borehole represents lateral displacement of a geological plane.

2. An optical displacement sensor as recited in claim 1 wherein the light source means is at least one light emitting diode.

3. An optical displacement sensor as recited in claim 2 wherein the photoelectric transducing means is a charged coupled device.

* * * * *